(12) United States Patent
Dowker

(10) Patent No.: US 7,653,073 B2
(45) Date of Patent: Jan. 26, 2010

(54) METHODS AND SYSTEMS FOR DELIVERY OF BROADBAND SERVICES TO CUSTOMER PREMISES EQUIPMENT

(75) Inventor: Mark James Dowker, Almonte (CA)

(73) Assignee: BCE Inc., Verdun, Quebec (CA)

( * ) Notice: Subject to any disclaimer, the term of this patent is extended or adjusted under 35 U.S.C. 154(b) by 914 days.

(21) Appl. No.: 11/002,191

(22) Filed: Dec. 3, 2004

(65) Prior Publication Data

US 2006/0002369 A1 Jan. 5, 2006

Related U.S. Application Data

(60) Provisional application No. 60/584,159, filed on Jul. 1, 2004.

(51) Int. Cl.
*H04L 12/28* (2006.01)
*H04L 12/56* (2006.01)
*G06F 15/16* (2006.01)
*H04N 7/173* (2006.01)

(52) U.S. Cl. ............... 370/401; 709/217; 725/87

(58) Field of Classification Search .............. 370/401; 725/87; 709/217
See application file for complete search history.

(56) References Cited

U.S. PATENT DOCUMENTS

| | | | |
|---|---|---|---|
| 2002/0026528 A1 | 2/2002 | Lo | |
| 2003/0106067 A1* | 6/2003 | Hoskins et al. | 725/119 |
| 2003/0167338 A1 | 9/2003 | Hare et al. | |
| 2004/0052212 A1* | 3/2004 | Baillargeon | 370/235 |
| 2004/0228363 A1* | 11/2004 | Adamczyk et al. | 370/468 |
| 2005/0273827 A1* | 12/2005 | Javed et al. | 725/90 |
| 2006/0080441 A1* | 4/2006 | Chen et al. | 709/225 |

OTHER PUBLICATIONS

Understanding NAT, by Neil Briscoe, Problem Solving: Internet; PC Network Advisor; Issue 111 (Oct. 1999) pp. 21-22.
Screen Plays; The strategic guide to broadband content and applications; A Publication of Broadband InformationResourses, Inc.; vol. 1, No. 5; Sep. 2003; (3 pages).
Network Magazine—Technology Architecture for the 21st Century; CMP; IP Telephony and Network Address Translation; downloaded from: http://www.networkmagazine.com/shared/article/showArticle.jhtml?articleId=17602009&classroom=; Mar. 19, 2004; (pp. 1-3).
Network Magazine—Technology Architecture for the 21st Century, CMP; TR-059 Brings QoS to DSL; downloaded from: http://www.networkmagazine.com/shared/article/showArticle.jhtml?articleId=16600121&classroom=Mar. 19, 2004; (pp. 1-2).

(Continued)

*Primary Examiner*—Kevin C Harper

(57) ABSTRACT

In accordance with the method, a request for a broadband service is provided to a service portal via a communication session established therewith. Configuration data associated with the requested broadband service is received from the service portal via the communication session. The configuration data is then provided to a broadband content server, and the requested broadband service is received via a second communication session, established with the broadband content server. Also, there is provided customer premises equipment, which comprises a first apparatus operative to support a first logical connection for data communications and a second apparatus operative to support a second logical connection for video communications. The present invention allows prioritization of video relative to data, as well as increased security from the perspective of the video content owner and increased simplicity from the perspective of the user.

87 Claims, 5 Drawing Sheets

OTHER PUBLICATIONS

RFC 2516 (rfc2516)—Internet RFC/STD/FYI/BCP Archives;RFC 2516—A Method for Transmitting PPP Over Ethernet (PPPoE); by L. Mamakos; K. Lidl; J. Evarts; (UUNET Technologies, Inc.); D. Carrel; D. Simone (RedBack Networks, Inc.); R. Wheeler (RouterWare, Inc.) Feb. 1999; first downloaded from: http://www.faqs.org/rfcs/rfc2516.html; Mar. 19, 2004; (pp. 1-12).

* cited by examiner

METHODS AND SYSTEMS FOR DELIVERY OF BROADBAND SERVICES TO CUSTOMER PREMISES EQUIPMENT

CROSS-REFERENCES TO RELATED APPLICATIONS

This application claims the benefit under 35 U.S.C. §119(e) of U.S. Provisional Patent Application Ser. No. 60/584,159 to Dowker, filed Jul. 1, 2004, hereby incorporated by reference herein.

FIELD OF THE INVENTION

The present invention relates generally to methods and systems for enabling the delivery of broadband services to customer premises equipment and, in a specific example, to the delivery of selected video products to a set top box at a subscriber's home.

BACKGROUND OF THE INVENTION

As the number and variety of services available on the Internet increases, it is not surprising that the number of residential users having Internet access via an Internet service provider (ISP) is increasing accordingly. Meanwhile, these same users continue to have traditional entertainment viewing needs. Typically, such needs have been satisfied by broadcast, satellite and cable television systems, which operate independently of a given user's Internet connection and thus require an independent configuration process to be executed by the user when a particular entertainment product is desired. Clearly, this is an inconvenience for the user, not the least of which is the need to establish and maintain a separate financial relationship with the entertainment service provider.

On the other hand, there has been an increase in the number of entertainment services available directly from the Internet. Thus, some users have supplemented or even supplanted their traditional entertainment service provider in favour of Internet-based entertainment services. However, this approach poses technological problems of its own arising from a lack of prioritization on the connection to the ISP. Furthermore, from a content owner's point of view, there may be a reluctance to allow copyrighted digital content to be distributed via the Internet, where it is readily pirated upon being downloaded onto a computer. This contributes to stunting the rate at which proprietary entertainment content is becoming available via the Internet.

From the above, it is clear that there exists a need in the industry to improve the delivery of broadband services to residential users.

SUMMARY OF THE INVENTION

According to a first broad aspect, the present invention seeks to provide a method. The method comprises providing a request for a broadband service to a service portal via a communication session established with the service portal; receiving configuration data associated with the requested broadband service from the service portal via the communication session established with the service portal; providing the configuration data to a broadband content server; and receiving the requested broadband service via a communication session established with the broadband content server.

According to a second broad aspect, the present invention seeks to provide a customer premises equipment, which comprises means for providing a request for a broadband service to a service portal via a communication session established with the service portal; means for receiving configuration data associated with the requested broadband service from the service portal via the communication session established with the service portal; means for providing the configuration data to a broadband content server; and means for receiving the requested broadband service via a communication session established with the broadband content server.

According to a third broad aspect, the present invention seeks to provide a system for delivery of a broadband service to customer premises equipment. The system comprises a service portal, operative to receive a request for a broadband service from the customer premises equipment over a first communication session established with the customer premises equipment and to obtain configuration data associated with the requested broadband service, as well as to provide the configuration data to the customer premises equipment over the first communication session established with the customer premises equipment. The system also comprises a broadband content server, operative to receive the configuration data from the customer premises equipment, and to channel the requested broadband service over a second communication session established with the customer premises equipment.

According to a fourth broad aspect, the present invention seeks to provide a method for delivery of a broadband service to customer premises equipment. The method comprises, at a service portal, receiving a request for a broadband service from the customer premises equipment over a first communication session established with the customer premises equipment, obtaining configuration data associated with the requested broadband service and providing the configuration data to the customer premises equipment over the first communication session established with the customer premises equipment. The method also comprises, at a broadband content server, receiving the configuration data from the customer premises equipment and channelling the requested broadband service over a second communication session established with the customer premises equipment.

According to a fifth broad aspect, the present invention seeks to provide a method, which comprises receiving a request for a broadband service from customer premises equipment over a first communication session established with the customer premises equipment, obtaining configuration data associated with the requested broadband service and providing the configuration data to the customer premises equipment over the first communication session established with the customer premises equipment. The configuration data provided to the customer premises equipment is instrumental in causing the delivery of the requested broadband service over a second communication session established between the customer premises equipment and a broadband content server having the ability to associate the configuration data with the requested broadband service.

According to a fifth broad aspect, the present invention seeks to provide computer-readable storage media tangibly embodying a program of instructions executable by a computer to perform a method. The method comprises providing a request for a broadband service to a service portal over a communication session established with the service portal, receiving configuration data associated with the requested broadband service from the service portal over the communication session established with the customer premises equipment, providing the configuration data to a broadband content server, and receiving the requested broadband service over a communication session established with the broadband content server.

According to a sixth broad aspect, the present invention seeks to provide customer premises equipment, comprising means for establishing a first communication session with a service portal and means for establishing a second communication session with a broadband content server while the first communication session is ongoing.

According to a seventh broad aspect, the present invention seeks to provide customer premises equipment, which comprises a first apparatus operative to support a first logical connection for data communications and a second apparatus operative to support a second logical connection for video communications.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

Figure 1A:
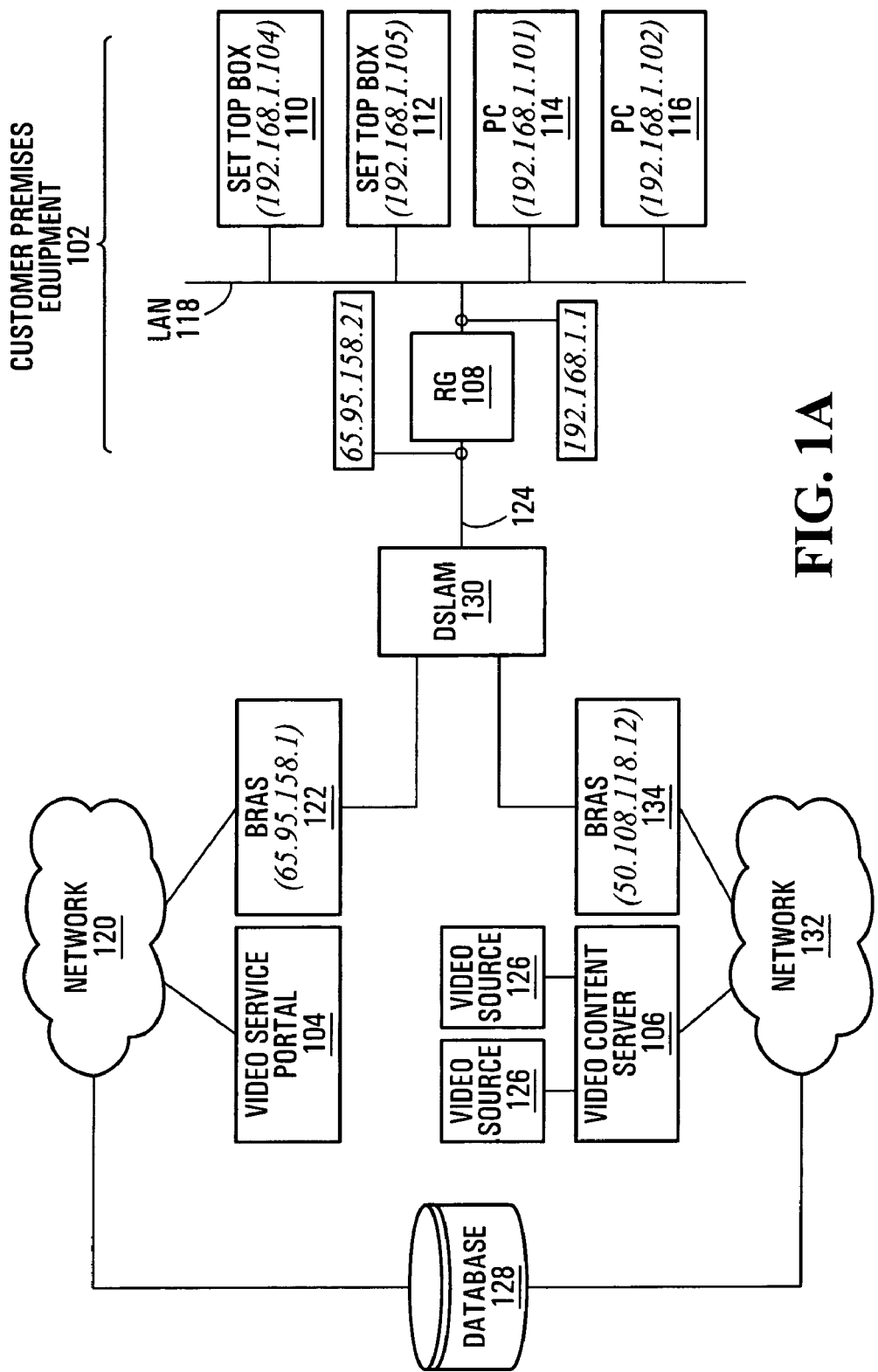
FIG. 1A shows, in block diagram form, a physical interconnection amongst various entities involved in the delivery of broadband services in accordance with a first embodiment of the present invention.

With reference to FIG. 1A, there is shown a system for delivering broadband services to a user of customer premises equipment 102. In an example, which is for illustration purposes only and is not intended to limit the scope of the present invention, the broadband service is a video product. That is to say, the user is assumed to be desirous of watching a video product on one or more television screens in the home, beginning in a matter of minutes, if not seconds. By way of non-limiting example, the requested video product may be a movie or television show selection, a channel selection (which provides a sequential stream of movies or television shows) or a selection of a group of channels, possibly including all available channels. To enable delivery of the requested video product, an interaction will take place amongst customer premises equipment 102, a video service portal 104 and a video content server 106, as described in greater detail herein below.

In a "connected" home as envisaged herein, the customer premises equipment 102 may include a routing gateway (or router) 108 connected to a plurality of in-home devices, such as set top boxes 110, 112, computers 114, 116, appliances, and so on. In an example embodiment, the routing gateway 108 comprises hardware and software necessary to allow the in-home devices to communicate with each other via a local area network (LAN) 118. For instance, the routing gateway 108 may act as an Ethernet switch for the various in-home devices. In another example, the routing gateway 108 may have wireless capabilities, e.g., in accordance with IEEE standards 802.11a, 802.11b, 802.11g, etc. Additionally, as will be described in further detail later on, the routing gateway 108 communicates with the video service portal 104 as well as the video content server 106, and provides routing functionality between these components and the in-home devices, in particular the set top boxes 110, 112 which are connected to television screens.

The video service portal 104 acts as a "storefront" where the user may make a video product selection by way of an input device such as a keyboard or a remote control unit connected to one of the set top boxes 110, 112. The video service portal 104 comprises the necessary control logic to process and grant a particular user's request to watch a video product (movie or television show or channel or group of channels etc.) and thus may be responsible for handling financial transactions, authentication procedures, etc. Where the broadband services extend beyond video, it will be understood that the video service portal 104 can be referred to more generally as a "broadband service portal" or simply a "service portal".

A suitable embodiment of the video service portal 104 is a web server, whereby the video service portal 104 is accessible via a network 120, such as an IP-based network (e.g., the public data network known as the Internet). Under such circumstances, the user is assumed to have access to the network 120, as is commonly achieved by creating a relationship with a network service provider. Specifically, a broadband remote access server (BRAS) 122 represents the server which interacts with the routing gateway 108, allowing the user to access the network 120 and, by extension, to interact with the video service portal 104. The BRAS 122 is connected to the routing gateway 108 by a physical communication link 124, such as optical fiber, copper twisted pair, wireless, etc.

For its part, the video content server 106 acts as a back office from which the user's selected video is retrieved and then delivered to the user via a network 132. The network 132 may be the same as the network 120, e.g., when both networks represent the Internet. Alternatively, the network 132 may be separate from the network 120, e.g., when the network 132 is the Internet and the network 132 is a media distribution network, such as a television distribution network (e.g., cable, etc.). In the specific embodiment of FIG. 1A, the user is presumed to have access to the network 132 via a second broadband remote access server (BRAS) 134, allowing the customer premises equipment 102 to access the network 132 and, by extension, to interact with the video content server 106.

The BRAS 134 is connected to the routing gateway 108, in part by the same physical communication link 124 which connects the BRAS 122 to the routing gateway 108. In order to allow non-interfering communication to take place over the same physical medium a DSLAM (digital subscriber loop access multiplexer) 130 can be provided as shown in FIG. 1A.

A role of the video content server 106 is to route video streams from one or more video sources 126 towards the set top boxes 110, 112 in the home via the network 132 and the routing gateway 108. It should be noted that the video streams may be unicast, multicast or broadcast in nature, i.e., they may be intended for an audience of one or many set top boxes throughout a service domain, including the possibility where multiple recipient set top boxes are located at the same customer premises equipment 102. The video content server 106 comprises the necessary control logic to communicate with the video sources 126, thereby causing them to release the video streams which are channelled to the customer premises equipment 102. In a more general sense, the video content server 106 may be thought of as a "broadband service server", which delivers broadband services from one or more "broadband service termination points" to the in-home devices. Moreover, it is within the scope of the invention for the delivered services to be interactive in nature, i.e., having a component of data flow from the broadband service termination points to the user and vice versa.

In accordance with a specific non-limiting embodiment of the present invention, it is envisaged that both the video service portal 104 and the video content server 106 have access to a database 128 of "configuration data" associated with video products (such as movies, television shows, channels or groups of channels) and subscriber information. The configuration data associated with a particular video product can be viewed as an identifier of a video product which is accessible by the video service portal 104 and the video content server 106 but not to the user. Examples of "configuration data" include but are not limited to passwords, tokens, codes, etc. The use of configuration data in this manner provides a degree of authentication before a video product is released. Of course, a person skilled in the art will appreciate that other ways of enabling the release of a video product by the video content server 106 under control of information provided by the video service portal 104 are within the scope of the present invention.

In order to enable the delivery of broadband services to the customer premises equipment 102, a two-phase configuration process is followed, which will be described briefly now and then in greater detail later on. During the first phase of the configuration process, the customer premises equipment 102 provides a request for a broadband service (e.g., video product) to the video service portal 104 via a first communication session established with the video service portal 104. During this first communication session, the customer premises equipment 102 receives, from the video service portal 104, configuration data associated with the requested broadband service. At this point, the second phase is initiated, whereby the customer premises equipment 102 communicates the received configuration data to the video content server 106. The requested video product is then delivered to the customer premises equipment via a second communication session established with the video content server 106. It is noted that the second communication session can be established while the first communication session is ongoing.

Figure 1B:
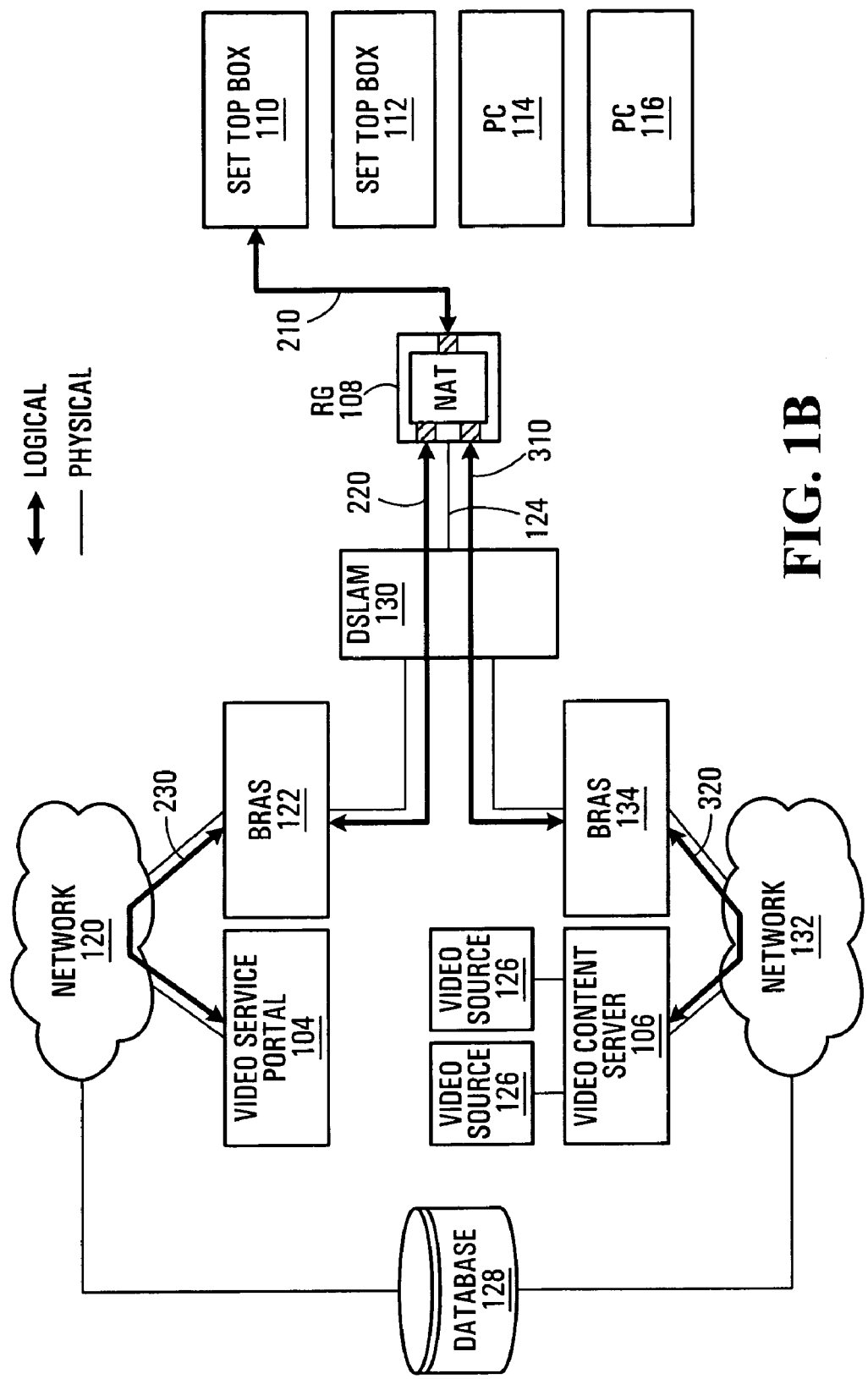
FIGS. 1B and 1C show two possible instantiations of the embodiment of FIG. 1A at the logical level.

With reference to FIG. 1B, there is shown a first possible instantiation of the first and second communication sessions used in the configuration process. The first communication session is established between the set top box 110 and the video service portal 104. The first communication session involves numerous logical connections, namely, a first logical connection 210 between the set top box 110 and the routing gateway 108, a second logical connection 220 between the routing gateway 108 and the BRAS 122, and a third logical connection between the BRAS 122 and the video service portal 104 (via the network 120).

The first logical connection 210 may be carried over an underlying transport layer connection such as Ethernet. An example protocol that can be used by the endpoints of the first logical connection 210 to support the first logical connection 210 over the underlying transport layer connection is the native Ethernet protocol, although other protocols may be used. The second logical connection 220, which can be an always-on connection (providing continuous network access) or can be established only when the user is ready to request a video product, may be carried over an underlying transport layer connection such as an ATM permanent virtual circuit— PVC. An example protocol that can be used by the endpoints of the second logical connection 220 to support the second logical connection 220 over the underlying transport layer connection is the Point-to-Point-over-Ethernet (PPPoE) protocol, although other protocols may be used. The third logical connection 230 may be carried over a series of underlying transport layer connections. An example protocol that can be used by the endpoints of the third logical connection 230 to support the third logical connection 230 over the underlying transport layer connections is TCP/IP, although other protocols may be used.

The manner in which the three logical connections 210, 220, 230 contribute to create the first communication session is now described. For instance, consider packets sent by the set top box 110 towards the video service portal 104 over the first logical connection 210. These packets, which are received at the routing gateway 108, identify the video service portal 104 in a header portion, for example. (In other cases these packets may identify other destinations, as will be described later on.) The routing gateway 108 determines that the received packets should be sent to the BRAS 122 over the second logical connection 220. However, because the LAN 118 is not visible to entities outside the LAN 118, a process called network address translation (NAT) needs to be performed to ensure that return packets can be properly routed within the LAN 118 when received from the video service portal 104. At the BRAS 122, the packets received from the routing gateway 108 are routed to the video service portal 104 in a straightforward manner over the third logical connection 230.

To better explain the role of network address translation (NAT) at the routing gateway 108, reference is now made back to FIG. 1A, where set top box 110 is assigned address 192.168.1.104, set top box 112 is assigned address 192.168.1.105, computer 114 is assigned address 192.168.1.101 and computer 116 is assigned address 192.168.1.102. In addition, also for the purposes of communication within the LAN 118, routing gateway 108 may be assigned address 192.168.1.1. The assigning of addresses typically occurs upon creation of the LAN 118 and as devices are added to the LAN 118. It is apparent that any of the in-home devices connected to the LAN 118 can communicate with any of the other in-home devices, or with the routing gateway 108, by simply directing IP packets to the corresponding address. For example, when set top box 110 performs this activity with the routing gateway 108, one ends up with logical connection 210. This can be achieved using a native Ethernet protocol.

In addition, the routing gateway 108 communicates with the "outside world" (relative to the customer premises equipment 102), in this case with the BRAS 122 and the BRAS 134. Again, if an IP-based protocol is to be used for communication, there will be an IP address assigned to each of these entities, for the purposes of communicating with each other. For example, the routing gateway 108 may be assigned address 65.95.158.21, the BRAS 122 may be assigned address 65.95.158.1 and the BRAS 134 may be assigned address 50.108.118.12. The assigning of addresses typically occurs on a case-by-case basis, as new devices are added to the outside world.

Since the assigning of addresses for the purposes of communicating on the LAN 118 is done independently from the assigning of address for the purposes of communicating with the outside world, there is a chance of overlap. In other words, there may be two or more devices in different LANs that wish to communicate with the outside world, but which share the same IP address on their own local LANs. For example, if set top box 110 were to communicate to the BRAS 122 that return data should be sent to its IP address (i.e., 192.168.1.104), it is possible that this could create confusion, as there may very easily already be a device in the outside world (or in another LAN) with that same IP address.

In order to avoid this problem, the routing gateway 108 performs a process called network address translation (NAT). That is to say, the routing gateway 108 rewrites packets crossing the boundary between the LAN 118 and the outside world. Specifically, whereas the packets received at the routing gateway 108 from set top box 110 specify a source port (e.g., X) and address 192.168.1.104, the packets sent to the outside world specify a new source port (e.g., Y, as selected by the routing gateway 108) and the address of the routing gateway 108 itself, namely 65.95.158.21. Of course, the routing gateway 108 maintains a mapping, which associates source port X and address 192.168.1.104 to source port Y and address 65.95.158.21. Thus, when incoming packets are received by the routing gateway 108 from the outside world on port Y, the routing gateway 108 will consult the mapping and be able to re-write the incoming packets with the corresponding IP address (192.168.1.104) and the corresponding port (X).

Therefore, under the first communication session, which is assumed in this case to be pre-established, set top box 110 logs on to the video service portal 104. Specifically, set top box 110 signals the user's intention to access the video service portal 104, e.g., by interpreting a menu selection, web address or reserved channel number specified via a user device. The user also identifies a requested video product (e.g., movie, television show, channel, group of channels) to the video service portal 104. This may trigger the video service portal 104 to perform administrative functions, such as verifying authentication data (e.g., a username and password) provided by the user, updating the user's account, cross-referencing the request with restrictions in place for that user, gathering user information, etc.

Assuming that the request has been granted subsequent to an authentication operation, the video service portal 104 obtains configuration data associated with the requested video product. In a specific non-limiting example, the video service portal 104 consults the database 128 of tokens and retrieves the particular token associated with the requested video product and which, when supplied to the video content server 106, will allow it to identify the originally requested video product upon re-consultation of the database 128. The video service portal 104 sends the configuration data to set top box 110, still under the first communication session. In other embodiments, the configuration data will stop at the routing gateway 108.

At this point begins the second phase of the configuration process, now described with continued reference to FIG. 1B. Recalling that the customer premises equipment 102 (either the set top box 110 or the routing gateway 108) received a token from the video service portal 104 under the first communication session, the customer premises equipment 102 proceeds to establish the second communication session. The configuration data may itself contain all the necessary information which allows the customer premises equipment 102 to establish the second communication session. In any event, part of the configuration data (such as a token) is destined for the video content server 106 and, as such, the second communication session will be made up of multiple logical connections between the customer premises equipment 102 and the video content server 106.

In the specific example embodiment of FIG. 1B, the second communication session involves the previously described first logical connection 210 between the set top box 110 and the routing gateway 108, as well as a fourth logical connection 310 between the routing gateway 108 and the BRAS 134, and a fifth logical connection 320 between the BRAS 134 and the video content server 106 (via the network 132). The fourth logical connection 310 may be carried over an underlying transport layer connection such as an ATM permanent virtual circuit—PVC. An example protocol that can be used by the endpoints of the fourth logical connection 310 to support the fourth logical connection 310 over the underlying transport layer connection is the Point-to-Point-over-Ethernet (PPPoE) protocol, although other protocols may be used. For its part, the fifth logical connection 320 may be carried over a series of underlying transport layer connections. An example protocol that can be used by the endpoints of the fifth logical connection 320 to support the fifth logical connection 320 over the underlying transport layer connections is TCP/IP, although other protocols may be used.

The three logical connections 210, 310, 320 contribute to create the second communication session in much the same way as the logical connections 210, 22, 230 contribute to create the first communication session. Consider, for instance, packets sent by the set top box 110 towards the video content server 106 over the first logical connection 210. These packets, which are received at the routing gateway 108, identify the video content server 106 in a header portion, for example. The routing gateway 108 determines that the received packets should be sent to the BRAS 134 over the fourth logical connection 310. However, because the LAN 118 is not visible to entities outside the LAN 118, the previously described network address translation (NAT) process needs to be performed to ensure that return packets can be properly routed within the LAN 118 when received from the video content server 106. At the BRAS 134, the packets received from the routing gateway 108 are routed to the video content server 106 in a straightforward manner over the fifth logical connection 320.

Following receipt of the configuration data (e.g., a token) from set top box 110 or the routing gateway 108, the video content server 106 accesses the database 128 of tokens in order to identify which of the video sources 126 corresponds to the received token. Assuming that the corresponding video source is denoted 126*, then what follows is a release of a broadband data stream (in this case, a video stream) from video source 126* to set top box 110 via the video content server 106, the BRAS 134 and the routing gateway 108.

It is noted that the particulars of the configuration data used to set up the second communication session need not be revealed to the user, thus providing control over the release of video content. Furthermore, some content owners may consider it a security feature that the network 132 used to distribute the broadband content can be different from the Internet. In addition, no financial relationship needs to exist between the user and the supplier of video content, which affords convenience and flexibility from the user's perspective. Moreover, it is noted that the establishment of two underlying transport layer connections over the same communication link 124 facilitates the prioritization of logical connection 310 with respect to logical connection 220 (i.e., video with respect to data), within the specific bandwidth constraints of the communication link 124.

Figure 1C:
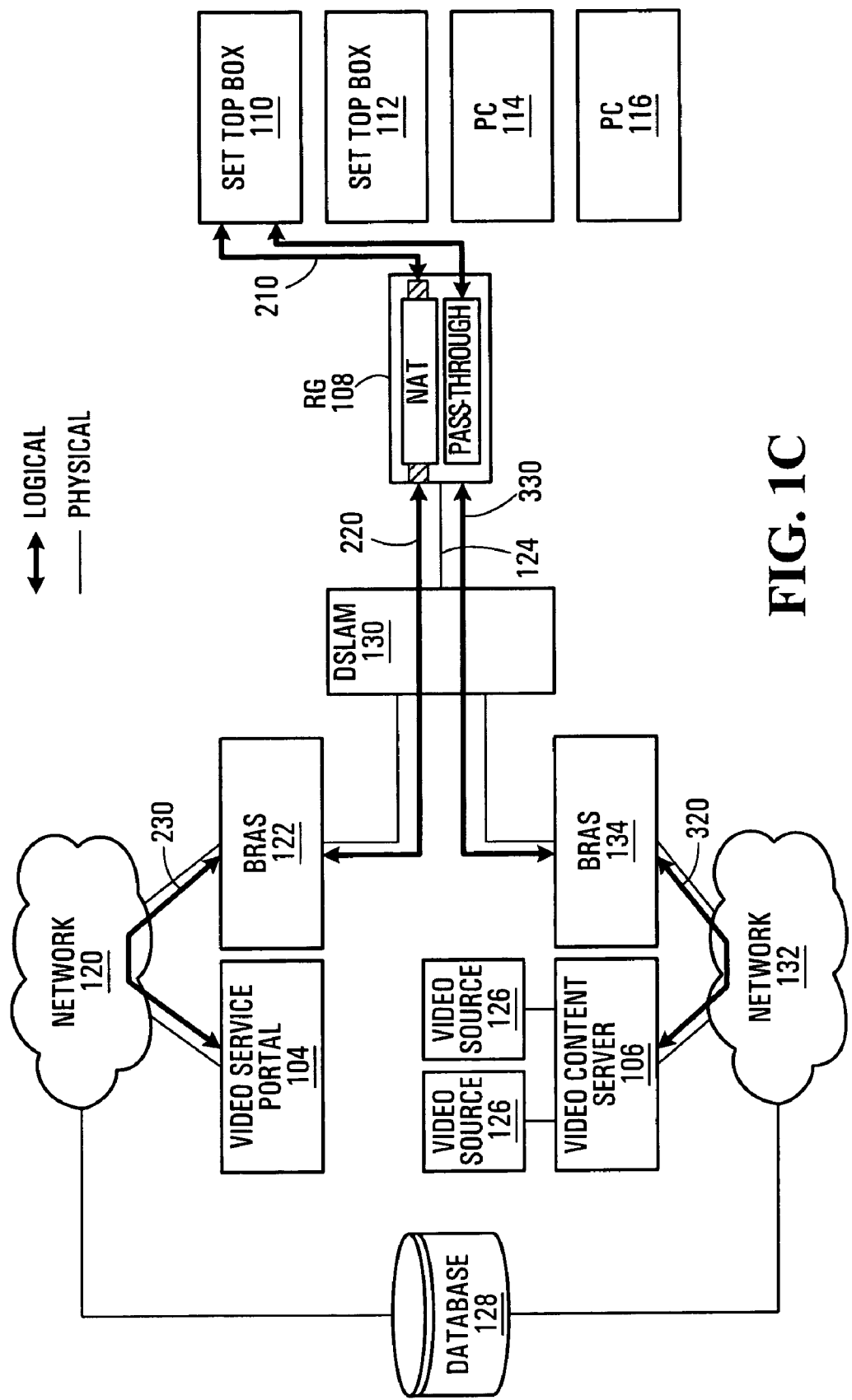

With reference to FIG. 1C, there is shown a second possible instantiation of the first and second communication sessions used in the configuration process. The first communication session is established as before, between the set top box 110 and the video service portal 104. It is recalled that the first communication session involves a first logical connection 210 between the set top box 110 and the routing gateway 108, a second logical connection 220 between the routing gateway 108 and the BRAS 122, and a third logical connection between the BRAS 122 and the video service portal 104 (via the network 120). As before, the routing gateway performs network address translation (NAT) to ensure that return packets can be properly routed within the LAN 118 when received from the video service portal 104.

Thus, under the first communication session, set top box 110 signals the user's intention to access the video service portal 104, e.g., by interpreting the user's entry of a menu selection, web address or reserved channel number. The user also identifies a requested video product (e.g., movie, television show, channel, group of channels) to the video service portal 104. This may trigger the video service portal 104 to perform administrative functions, such as verifying a username and password provided by the user, updating the user's account, cross-referencing the request with restrictions in place for that user, gathering user information, etc. Assuming that the request has been granted, the video service portal 104 obtains configuration data associated with the requested video product. The video service portal 104 sends the configuration data to set top box 110, still under the first communication session.

At this point begins the second phase of the configuration process, now described with continued reference to FIG. 1C. As before, the second communication session will be made up of multiple logical connections between the customer premises equipment 102 and the video content server 106. However, in the specific example embodiment of FIG. 1C, the second communication session involves a new logical connection 330 between the set top box 110 and the BRAS 134, as well as the previously described fifth logical connection 320 between the BRAS 134 and the video content server 106 (via the network 132). The new logical connection 330 may be carried over a combination of underlying transport layer connections such as native Ethernet (between set top box 110 and the routing gateway 108) and an ATM PVC (between the routing gateway 108 and the BRAS 134).

An example protocol that can be used by the endpoints of the new logical connection 330 to support the new logical connection 330 over the combination of underlying transport layer connections is the Point-to-Point-over-Ethernet (PPPoE) protocol. In such an instantiation, the BRAS 134 assigns a new, temporary IP address to set top box 110 and a PPPoE pass-through function is invoked within the routing gateway 108. It is remarked that the routing gateway 108 therefore does not perform network address translation (NAT) on packets exchanged between set top box 110 and the BRAS 134 using the PPPoE protocol.

As was the case before, following receipt of the configuration data (e.g., a token) from set top box 110 or the routing gateway 108, the video content server 106 accesses the database 128 of tokens in order to identify which of the video sources 126 corresponds to the received token. Assuming that the corresponding video source is denoted 126*, then what follows is a release of a broadband data stream (in this case, a video stream) from video source 126* to set top box 110 via the video content server 106, the BRAS 134 and the routing gateway 108.

In addition to the benefits arising from the instantiation of FIG. 1A, the instantiation of FIG. 1B provides the added benefit of reducing latency which would otherwise be due to NAT performed at the routing gateway 108. Also, the transmission of multicast traffic is facilitated, since individual logical connections will be maintained between the BRAS 134 and each member of a multicast group (using individual temporary IP addresses), allowing the replication of traffic to be done at the BRAS 134 itself rather than at the routing gateway 108, which enables the use of a conventional routing gateway equipped with pass-through functionality. Alternatively, a multicast client could be introduced in the routing gateway 108 in FIG. 1B to allow multicasting to the set top boxes 110, 112.

Figure 2:
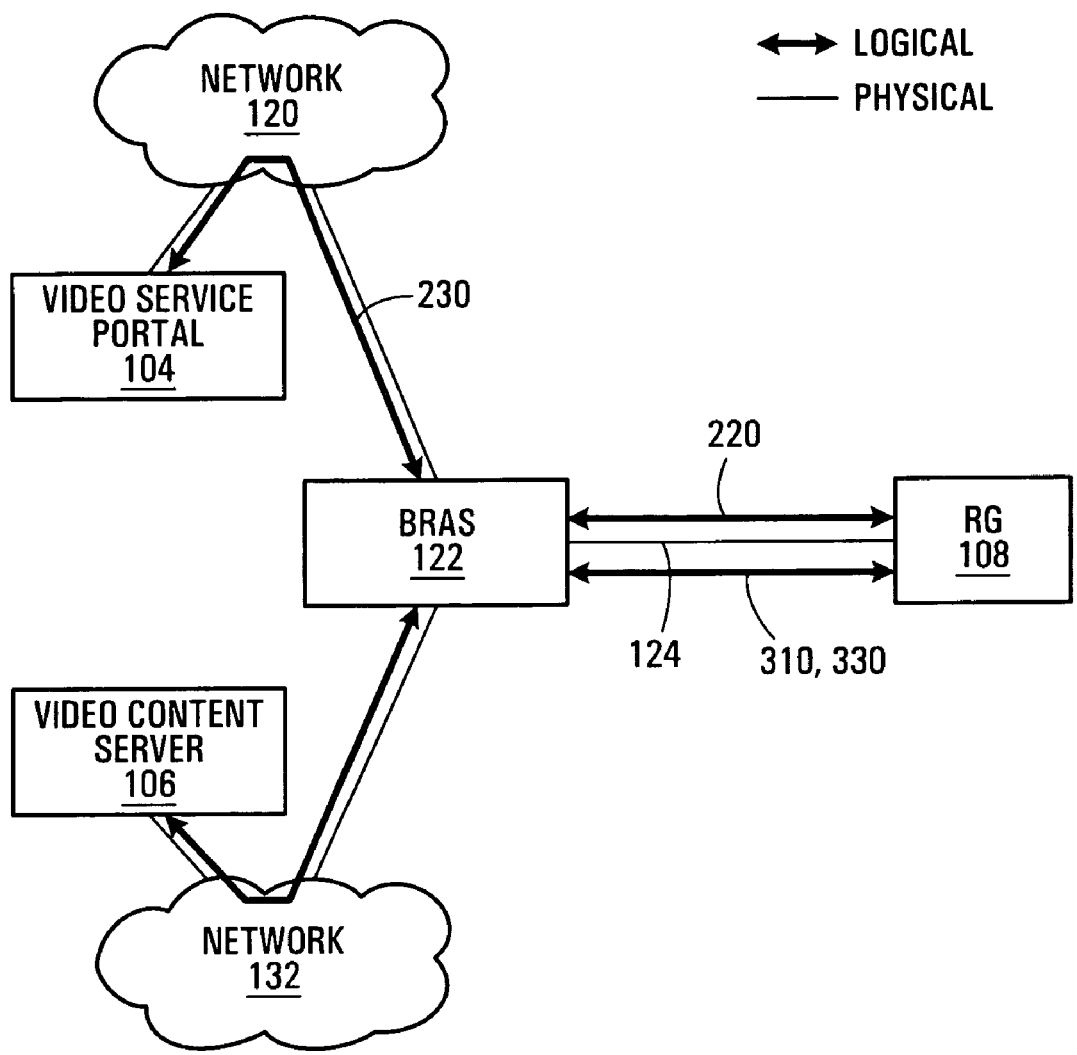
FIGS. 2 and 3 show, in block diagram form, two alternative embodiments of the physical interconnection of FIG. 1A, along with possible instantiations at the logical level.

In FIG. 2, there is shown another embodiment of the present invention, in which a single BRAS 122 provides the combined functionality of both BRAS 122 and BRAS 134 in FIGS. 1A-1C. That is to say, the BRAS 122 terminates either the pair of logical connections 220, 310 (in the case where the routing gateway 108 performs NAT) or the pair of logical connections 220, 330 (in the case where the routing gateway 108 does not perform NAT, such as when it performs a PPPoE pass-through function).

Figure 3:
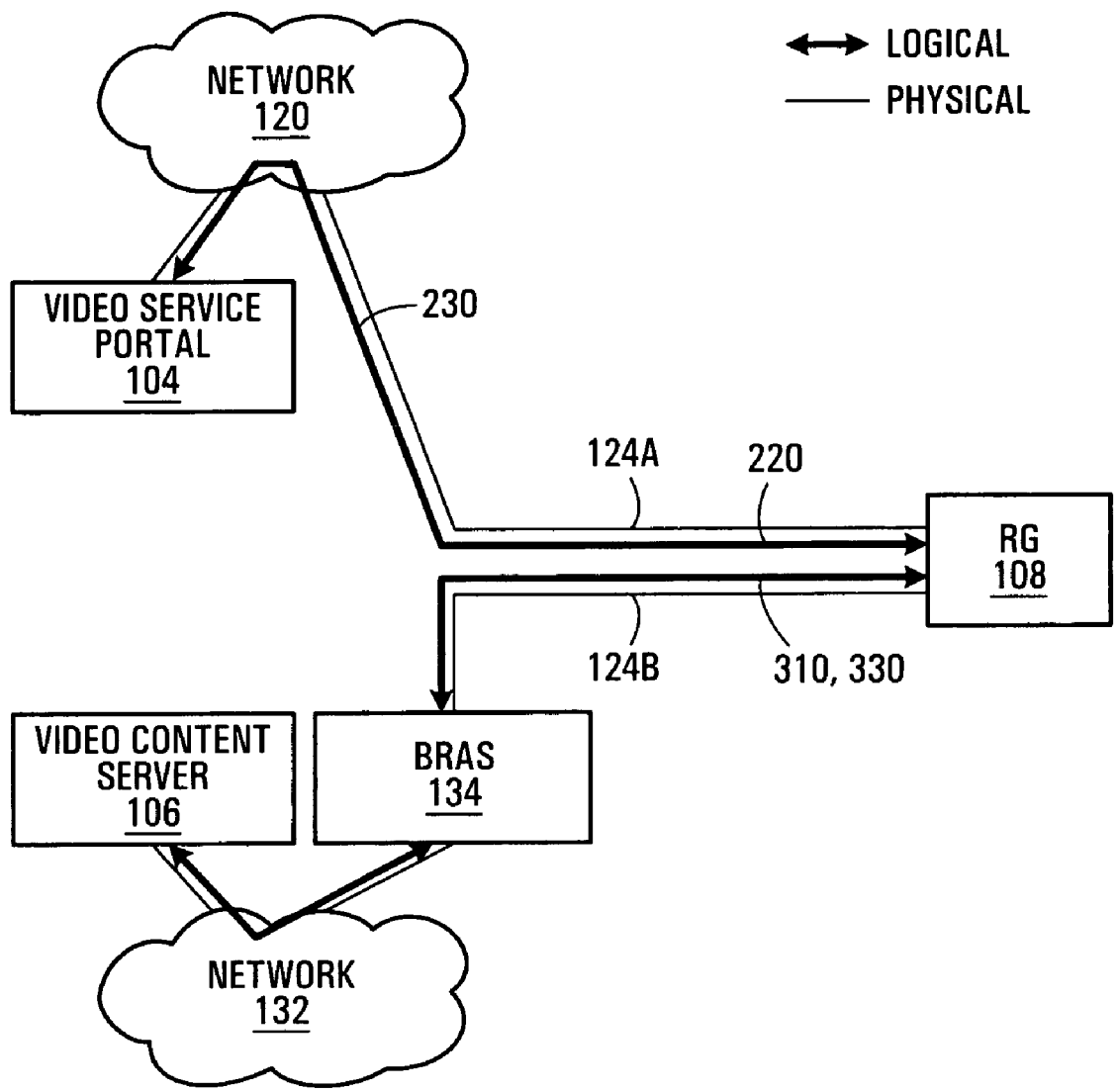

In FIG. 3, there is shown yet another embodiment of the present invention, in which the BRAS 134 provides the same functionality as in FIGS. 1A-1C, but where the former BRAS 122 has been eliminated. In this case, there is a "direct" logical connection between the routing gateway 108 and the network 120, i.e., bypassing a remote access server. It is envisaged that such a scenario would apply with a cable modem configuration. The direct connection to the network 120 is provided via a physical communication link 124 that is different from the physical communication link 124B leading to the BRAS 134.

Those skilled in the art will appreciate that in some embodiments, the functionality of the routing gateway 108, the BRAS 122, the BRAS 134, the video service portal 104 and the video content server 106 may be implemented as pre-programmed hardware or firmware elements (e.g., application specific integrated circuits (ASICs), electrically erasable programmable read-only memories (EEPROMs), etc.), or other related components. In other embodiments, the routing gateway 108, the BRAS 122, the BRAS 134, the video service portal 104 and the video content server 106 may be implemented as an arithmetic and logic unit (ALU) having access to a code memory (not shown) which stores program instructions for the operation of the ALU. The program instructions could be stored on a medium which is fixed, tangible and readable directly by the routing gateway 108, video service portal 104 and video content server 106, (e.g., removable diskette, CD-ROM, ROM, or fixed disk), or the program instructions could be stored remotely but transmittable to the routing gateway 108, video service portal 104 and video content server 106 via a modem or other interface device (e.g., a communications adapter) connected to a network over a transmission medium.

The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. A method, comprising:

providing a request for a broadband service to a service portal via a first communication session established with the service portal;

receiving configuration data associated with the requested broadband service from the service portal via the first communication session established with the service portal;

providing the configuration data to a broadband content server;

obtaining a temporary address that is valid for the duration of a second communication session established with the broadband content server; and receiving the requested broadband service via the second communication session established with the broadband content server using the temporary address;

wherein the step of obtaining the temporary address is performed after the step of providing the configuration data to the broadband content server.

2. The method defined in claim 1 further comprising:
establishing the first communication session.

3. The method defined in claim 1, the communication session established with the service portal provides continuous access to a data network.

4. The method defined in claim 1 further comprising:
establishing the second communication session.

5. The method defined in claim 1 further comprising:
establishing the second communication session subsequent to receiving the configuration data associated with the requested broadband service from the service portal.

6. The method defined in claim 1 further comprising:
establishing the second communication session subsequent to providing the configuration data to the broadband content server.

7. The method defined in claim 1, further comprising:
receiving a message from a user input device, the message specifying the requested broadband service.

8. The method defined in claim 7, wherein said request comprises authentication data regarding a user.

9. The method defined in claim 8, wherein the step of receiving configuration data associated with the requested broadband service from the service portal over the first communication session established with the service portal is conditional upon successful authentication of the user on the basis of the authentication data.

10. The method defined in claim 1 further comprising:
performing network address translation at a customer premises routing gateway for packets conveyed during the first communication session.

11. The method defined in claim 10, wherein the first communication session comprises a PPPoE connection terminated at the customer premises routing gateway.

12. The method defined in claim 10, further comprising:
bypassing network address translation at the customer premises routing gateway for packets conveyed during the second communication session.

13. The method defined in claim 12, wherein the first communication session comprises a PPPoE connection terminated at the customer premises routing gateway and wherein the second communication session comprises a PPPoE connection that utilizes a PPPoE pass-through functionality at the customer premises routing gateway.

14. The method defined in claim 10, further comprising:
performing network address translation at the customer premises routing gateway for packets conveyed during the second communication session.

15. The method defined in claim 14, wherein the first communication session comprises a first PPPoE connection terminated at the customer premises routing gateway and wherein the second communication session comprises a second PPPoE connection terminated at the customer premises routing gateway, the first and second PPPoE connections being distinct.

16. The method defined in claim 1, further comprising utilizing a pass-through functionality at a routing gateway traversed by packets conveyed during the second communication session.

17. The method defined in claim 1, wherein the configuration data comprises data required by the broadband content server to cause delivery of the requested broadband service.

18. The method defined in claim 17, wherein the requested broadband service is a video product.

19. The method defined in claim 18, wherein the configuration data comprises a token indicative of said video product.

20. The method defined in claim 19, wherein said video product is at least one of a movie and a television show.

21. The method defined in claim 19, wherein said video product is at least one television channel.

22. The method defined in claim 1, wherein the first communication session is carried over a first transport layer connection having a first priority and wherein the second communication session is carried over a second transport layer connection having a second priority greater than the first priority.

23. The method defined in claim 1, wherein at least one of the first and second communication sessions traverses an IP-based network.

24. The method defined in claim 1, wherein one of the first and second communication sessions traverses the Internet and wherein the other of the first and second communication sessions avoids traversing the Internet.

25. Customer premises equipment, comprising:
a set top box operative to implement the method of claim 1.

26. Customer premises equipment, comprising:
a routing gateway operative to implement the method of claim 1.

27. In combination, a routing gateway and a set top box, connected to one another and operative to implement the method of claim 1.

28. The combination defined in claim 27, the routing gateway being further operative to establish said first communication session.

29. The combination defined in claim 28, the routing gateway being further operative to establish said second communication session.

30. The combination defined in claim 28, the set top box being further operative to establish said second communication session.

31. The combination defined in claim 28, the routing gateway being further operative to perform network address translation for packets conveyed during the first communication session.

32. The combination defined in claim 30, the routing gateway being further operative to perform network address translation for packets conveyed during the first communication session.

33. The combination defined in claim 32, the routing gateway being further operative to bypass network address translation for packets conveyed during the second communication session.

34. The combination defined in claim 29, the routing gateway being further operative to perform network address translation for packets conveyed during the first communication session and for packets conveyed during the second communication session.

35. Customer premises equipment, comprising:
means for providing a request for a broadband service to a service portal via a first communication session established with the service portal;

means for receiving configuration data associated with the requested broadband service from the service portal via the first communication session established with the service portal;

means for providing the configuration data to a broadband content server;

means for obtaining a temporary address that is valid for the duration of a second communication session established with the broadband content server, the temporary address being obtained after providing the configuration data to the broadband content server; and means for receiving the requested broadband service via the second communication session established with the broadband content server using the temporary address.

36. The customer premises equipment defined in claim 35, implemented in a set top box.

37. The customer premises equipment defined in claim 35, implemented in a routing gateway.

38. A system for delivery of a broadband service to customer premises equipment, comprising:

a service portal, operative to:
receive a request for a broadband service from the customer premises equipment over a first communication session established with the customer premises equipment;
obtain configuration data associated with the requested broadband service;
provide the configuration data to the customer premises equipment over the first communication session established with the customer premises equipment;

a broadband content server, operative to:
receive the configuration data from the customer premises equipment;
provide a temporary address to the customer premises equipment that is valid for the duration of a second communication session established with the customer premises equipment, the temporary address being provided to the customer premises equipment after the configuration data is received from the customer premises equipment; and
channel the requested broadband service over the second communication session established with the customer premises equipment using the temporary address.

39. The system defined in claim 38, wherein said request comprises authentication data regarding a user.

40. The system defined in claim 39, wherein the service portal is operative to obtain the configuration data associated with the requested broadband service only upon successful authentication of the user on the basis of the authentication data.

41. The system defined in claim 38, further comprising a database that stores tokens associated with various potential requested broadband services, wherein the service portal being operative to obtain the configuration data associated with the requested broadband service comprises the service portal being operative to access said database to obtain the token associated with the requested broadband service.

42. The system defined in claim 41, further comprising a plurality of broadband service termination points operative to release respective broadband content under control of the broadband content server.

43. The system defined in claim 42, further comprising a plurality of broadband service termination points, wherein the broadband content server is further operative to access said database in order to identify the broadband service termination point associated with the requested broadband service on the basis of the token received as part of the configuration data.

44. The system defined in claim 43, the broadband content server being further operative to trigger the identified broadband service termination point to release its respective broadband content.

45. The system defined in claim 44, further comprising a broadband remote access server (BRAS) connected between the service portal and the customer premises equipment.

46. The system defined in claim 45, wherein the BRAS is connected to the service portal via an IP-based network.

47. The system defined in claim 45, the BRAS being a first BRAS, the system further comprising a second BRAS connected between the broadband content server and the customer premises equipment.

48. The system defined in claim 47, further comprising a DSLAM connected between the customer premises equipment and both the first BRAS and the second BRAS.

49. The system defined in claim 47, wherein the second BRAS is connected to the broadband content server via a data network.

50. The system defined in claim 47, wherein the second BRAS is connected to the broadband content server via a data network that is not the Internet.

51. The system defined in claim 45, wherein the broadband content server is connected to the customer premises equipment via said BRAS.

52. The system defined in claim 44, further comprising a broadband remote access server (BRAS) connected between the broadband content server and the customer premises equipment.

53. The system defined in claim 52, wherein the BRAS is connected to the broadband content server via a data network.

54. The system defined in claim 53, wherein the service portal is connected to the customer premises equipment via a second data network.

55. The system defined in claim 54, wherein the second data network is the Internet.

56. The system defined in claim 54, wherein the customer premises equipment is a cable modem.

57. The system defined in claim 38, wherein the first communication session utilizes network address translation performed at the customer premises equipment.

58. The system defined in claim 57, wherein the second communication session bypasses network address translation at the customer premises equipment.

59. The system defined in claim 38, wherein the second communication session bypasses network address translation at the customer premises equipment.

60. The system defined in claim 59, wherein the broadband content server is connected to the customer premises equipment via the Internet.

61. A method for delivery of a broadband service to customer premises equipment, comprising:

at a service portal:
receiving a request for a broadband service from the customer premises equipment over a first communication session established with the customer premises equipment;
obtaining configuration data associated with the requested broadband service;
providing the configuration data to the customer premises equipment over the first communication session established with the customer premises equipment;

at a broadband content server:
receiving the configuration data from the customer premises equipment;

providing a temporary address to the customer premises equipment that is valid for the duration of a second communication session established with the customer premises equipment, the temp address being provided to the customer premises equipment after the configuration data is received from the customer premises equipment; and channelling the requested broadband service over the second communication session established with the customer premises equipment using the temporary address.

62. The method defined in claim 61, wherein said request comprises authentication data regarding a user.

63. The method defined in claim 62, wherein the service portal is operative to obtain the configuration data associated with the requested broadband service only upon successful authentication of the user on the basis of the authentication data.

64. The method defined in claim 63, further comprising:
authenticating the user on the basis of the authentication data.

65. The method defined in claim 64, wherein the step of obtaining configuration data associated with the requested broadband service is performed conditionally upon successful authentication of the user.

66. The method defined in claim 65, wherein the step of providing the configuration data to the customer premises equipment over the first communication session is performed conditionally upon successful authentication of the user.

67. A method, comprising:
receiving a request for a broadband service from customer premises equipment over a first communication session established with the customer premises equipment;
obtaining configuration data associated with the requested broadband service;
providing the configuration data to the customer premises equipment over the first communication session established with the customer premises equipment;
the configuration data provided to the customer premises equipment resulting in the obtaining of a temporary address for the customer premises equipment that is valid for the duration of a second communication session established between the customer premises equipment and a broadband content server having the ability to associate the configuration data with the requested broadband service and causing the delivery of the requested broadband service over the second communication session.

68. A service portal adapted to perform the method defined in claim 67.

69. Computer-readable storage media tangibly embodying a program of instructions executable by a computer to perform a method comprising the steps of:
providing a request for a broadband service to a service portal over a first communication session established with the service portal;
receiving configuration data associated with the requested broadband service from the service portal over the first communication session established with the customer premises equipment;
providing the configuration data to a broadband content server;
obtaining a temporary address that is valid for the duration of a second communication session established with the broadband content server; and receiving the requested broadband service via the second communication session established with the broadband content server using the temporary address;
wherein the step of obtaining the temporary address is performed after the step of providing the configuration data to the broadband content server.

70. Customer premises equipment, comprising:
means for establishing a first communication session with a service portal, the first communication session utilizing network address translation at the customer premises equipment;
means for establishing a second communication session with a broadband content server while the first communication session is ongoing, the second communication session bypassing network address translation at the customer premises equipment;
a plurality of end user devices; and
a multicast processing entity operative to make copies of packets received from the broadband content server during the second communication session that are destined for a subset of the end user devices, the multicast processing entity further operative to send a copy of each copied packet to a corresponding one of the end user devices in the subset of the end user devices.

71. Customer premises as defined in claim 70, the first communication session delivering at least one of voice and data.

72. Customer premises equipment as defined in claim 70, the first communication session being established over the Internet.

73. Customer premises equipment as defined in claim 72, the first communication session being an always-on connection.

74. Customer premises equipment as defined in claim 73, the second communication session delivering at least one video stream to the customer premises equipment.

75. Customer premises equipment as defined in claim 70, the second communication session delivering at least one video stream to the customer premises equipment.

76. Customer premises equipment as defined in claim 75, wherein the video stream corresponds to a selection of a video product conveyed during the first communication session.

77. Customer premises equipment as defined in claim 70, wherein the customer premises equipment comprises a routing gateway and an end user device, wherein the first communication session comprises a PPPoE connection terminated at the routing gateway and wherein the second communication session comprises a PPPoE connection terminated at the end user device and utilizing a PPPoE pass-through functionality at the routing gateway.

78. Customer premises equipment as defined in claim 70, wherein the customer premises equipment comprises a routing gateway, wherein the first communication session comprises a first PPPoE connection terminated at the routing gateway and wherein the second communication session comprises a second PPPoE connection terminated at the routing gateway, the first and second PPPoE connections being distinct.

79. Customer premises equipment as defined in claim 70, the first communication session being carried by a first set of transport connections, the second communication session being carried by a second set of transport connections, wherein the first and second sets of transport connections comprise at least one common transport connection.

80. Customer premises equipment as defined in claim 70, wherein the first and second communication sessions have respective priorities, the priority of the second communication session being greater than the priority of the first communication session.

81. A method, comprising:
providing a request for a broadband service to a service portal via a first communication session established with the service portal;
receiving configuration data associated with the requested broadband service from the service portal via the first communication session established with the service portal;
providing the configuration data to a broadband content server;
receiving the requested broadband service via a second communication session established with the broadband content server;
making copies of packets received from the broadband content server during the second communication session that are destined for a subset of end user devices;
sending a copy of each copied packet to a corresponding one of the end user devices in the subset of the end user devices;
performing network address translation at a customer premises routing gateway for packets conveyed during the first communication session; and
bypassing network address translation at the customer premises routing gateway for packets conveyed during the second communication session.

82. The method defined in claim 81, wherein the first communication session comprises a PPPoE connection terminated at the customer premises routing gateway and wherein the second communication session comprises a PPPoE connection that utilizes a PPPoE pass-through functionality at the customer premises routing gateway.

83. In combination, a routing gateway and a set top box, connected to one another and operative to implement the method of claim 81.

84. The combination defined in claim 83, the routing gateway being further operative to establish said first and second communication sessions.

85. The combination defined in claim 83, the routing gateway being further operative to establish said first communication session and the set top box being further operative to establish said second communication session.

86. A system for delivery of a broadband service, comprising:
customer premises equipment;
a service portal, operative to:
receive a request for a broadband service from the customer premises equipment over a first communication session established with the customer premises equipment;
obtain configuration data associated with the requested broadband service;
provide the configuration data to the customer premises equipment over the first communication session established with the customer premises equipment;
a broadband content server, operative to:
receive the configuration data from the customer premises equipment;
channel the requested broadband service over a second communication session established with the customer premises equipment;
wherein the first communication session utilizes network address translation performed at the customer premises equipment and the second communication session bypasses network address translation at the customer premises equipment;
wherein the customer premises equipment comprises:
a plurality of end user devices; and
a multicast processing entity operative to make copies of packets received from the broadband content server during the second communication session that are destined for a subset of the end user devices, the multicast processing entity further operative to send a copy of each copied packet to a corresponding one of the end user devices in the subset of the end user devices.

87. The system defined in claim 86, wherein the broadband content server is connected to the customer premises equipment via the Internet.

* * * * *